Aug. 14, 1923.
R. P. McNEIL
1,465,018
SCRAPER
Filed Dec. 12, 1921
2 Sheets-Sheet 1
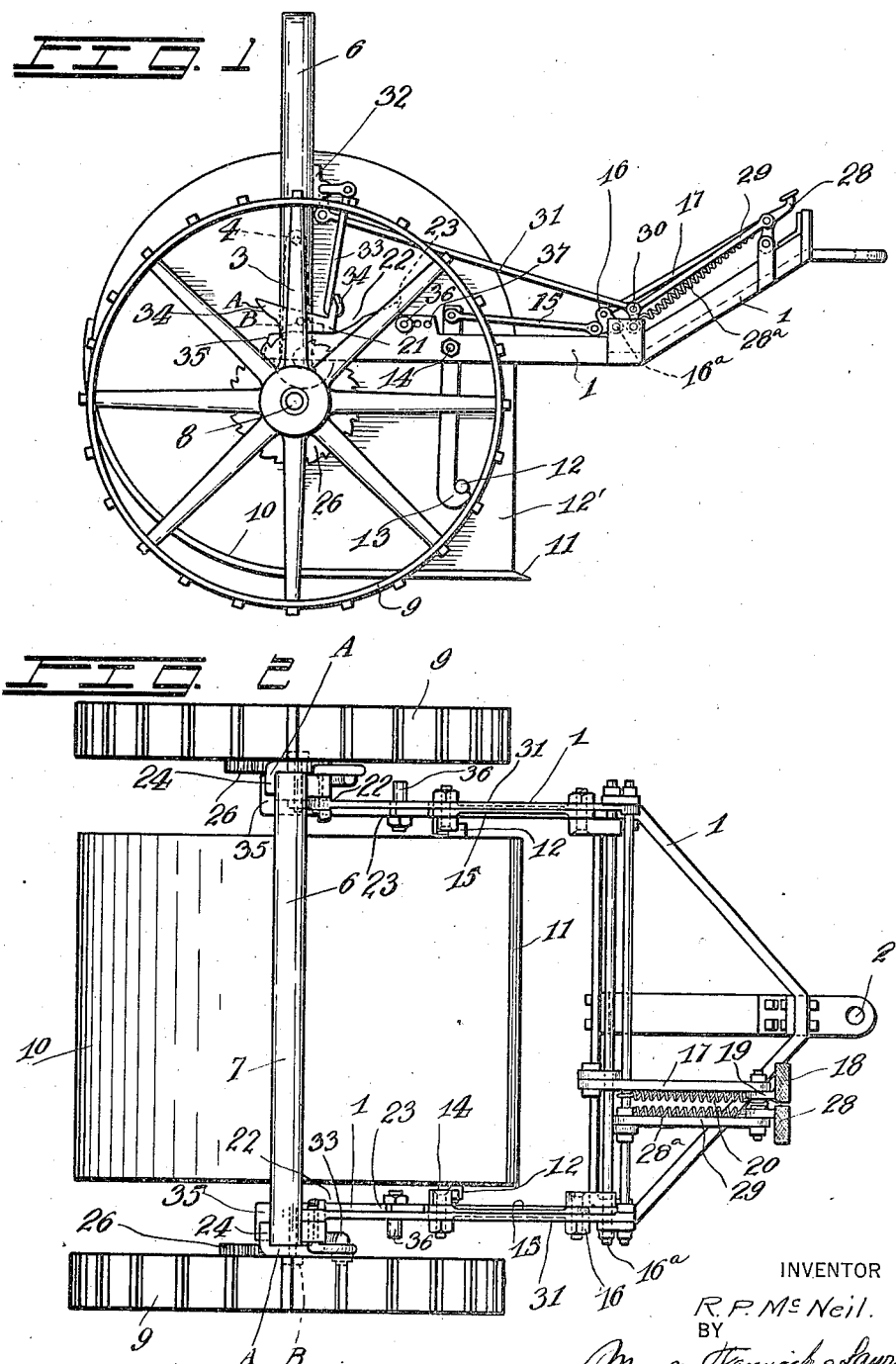
INVENTOR
R. P. McNeil.
BY
Mason, Fenwick & Lawrence
ATTORNEYS.

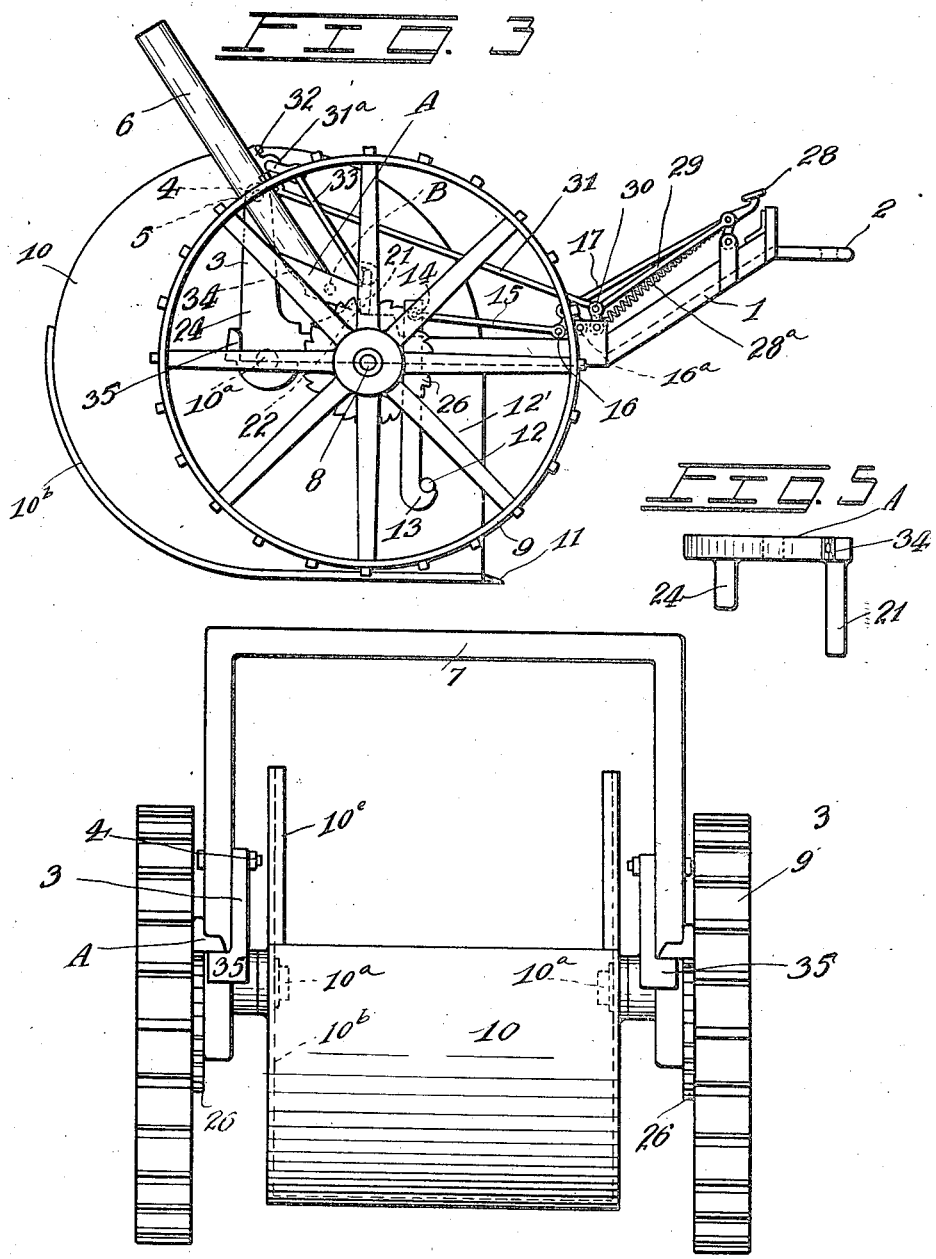

Patented Aug. 14, 1923.

1,465,018

UNITED STATES PATENT OFFICE.

RODERICK P. McNEIL, OF BARING, WASHINGTON.

SCRAPER.

Application filed December 12, 1921. Serial No. 521,798.

*To all whom it may concern:*

Be it known that I, RODERICK P. MCNEIL, a citizen of the United States, residing at Baring, in the county of King and State of Washington, have invented certain new and useful Improvements in Scrapers; and I do hereby declare the following to be a full, clear, and exact description of the invention, such as will enable others skilled in the art to which it appertains to make and use the same.

This invention relates to earth scrapers and dumping vehicles, and particularly to a form of scraper which will excavate below the carrying wheels, and when filled may be raised by the carrying wheels and transported thereby and emptied or dumped by either a forward or backward motion of the carrying wheels.

The objects of the invention are to provide a form of combination earth scraper or excavator and dump vehicle, which may be attached to any common form of tractor and operated by the driver of the tractor by means of foot pedals placed in suitable position to be reached from the seat of the tractor.

A further object is to provide a combination scraper and dump vehicle supported on two carrying wheels with scraper pan mounted on a frame which may be lowered or raised and the pan caused to excavate below the line of the wheels and when filled to be raised and transported to the dumping place and then emptied either from the front or rear of the vehicle.

The scrapers in common use generally require the services of more than one man for filling and dumping, and must be emptied by tipping the scraper pan forward which requires that the tractor or other motor power precede in position the scraper vehicle, and this is difficult where the dumping place is near or at the edge of a high fill or embankment, and by my invention I have provided a scraper and dumping vehicle which may be dumped backward as well as forward so that the tractor operating the apparatus may be kept at a suitable distance from the edge of the embankment while the earth from the scraper pan may be deposited at the brink of the bank.

Figure 1 is a side elevation with the scraper pan raised;

Fig. 2 is a top plan of Fig. 1;

Fig. 3 is a side elevation with the pan lowered;

Fig. 4 is a rear elevation with pan raised, and

Fig. 5 is a detail of the latch element.

Like numerals represent like parts, on the drawing.

1 is the supporting frame with the front end provided with an eye 2 for connection with any desired tractor, the rear end extends up at right angles to form an arm 3 which is pivotally connected on pin 4 which is positioned in the hole 5 in arm 3 for support from the upright parts of the main axle 6. The side posts of the axle are connected as a part of cross bar 7, and the main wheel spindles 8 for supporting the frame which extends out from the lower ends of posts 6, and any suitable supporting wheels 9 rotate on the spindles, while the main scraper pan 10 is pivotally supported on central pin $10^a$. The lower front end of the pan is sharpened down to an edge 11 for digging, and a reinforcing back $10^b$ is provided to form the pan for use. A lug 12 is provided and affixed in front end of pan marked 12' for supporting the front end of the pan when loading and loaded, by means of a supporting hook 13 pivotally connected to the frame 1 by pin 14, the top of hook 13 extending above the frame and connected by pin to rod 15, the latter to link 16 on pivot rod $16^a$ with another connecting rod 17 which is pressed forward by pedal 18 on lever 19 attached to the frame 1 so that when the pedal is depressed the hook 13 is thrown back from supporting the lug 12 thus permitting the scraper pan to rotate on its axle pins $10^a$, and to discharge its contents when the vehicle is drawn forward, and in case the dumping is to be behind the vehicle, the latter is backed and the pan rolls over backward on its axles and side $10^c$ until the open front end is toward the rear of the vehicle when the contents falls out as desired, and the forward motion of the machine then returned the pan to its position as at first and the supporting hook is thrown into position under the lug 12 by spring 20 connected to lever 19 and the frame 1 normally holding lever 19 toward the frame.

The position of the scraper pan is elevated or lowered with the supporting wheels by movement of the frame 1 forward which action is permitted by the side posts of the main axle 6 tilting back as in Fig. 3 to depress the pan or forward to position in Fig. 1 to raise the pan, and the frame is held in either position as may be desired by a latch member A, on a pivot pin B, the pin passing through the latch and holding the same for operation against the post 6 of the main axle. The front end of the latch is turned at right angles to form a pawl 21 for holding the frame, as the pawl drops into depressions on top of the frame as 22 as shown in Fig. 1 and when frame is tilted down the pawl drops in front of shoulder 23 on the frame and when in this position the main wheels are lifted above the ground and the machine is supported upon the pan and so remains until the pawl is withdrawn from the notch 23 and the frame thrown forward by the ratchet wheel 26 which is attached to inside of main wheel hub. The rear end of the latch is also turned at right angles for lock bolt 24 or rear pawl which is thrown into the ratchet wheel teeth as the front pawl 21 is raised and as the frame is then drawn forward with pawl 24 against the ratchet the main wheels 9 are thrown forward and downward until they raise the pan to position in Fig. 1, when pawl 21 again drops into notch 22 of frame, by tension of spring 28ª.

The latch or pawl member is operated by foot pedal 28 hinged to front end of frame with a connecting rod 29 attached thereto and connected by the pivot rod 30 to another rod 31 which is linked to bell crank 31ª journaled to post 6 by bearing 32, and a final rod 33 extending from the crank and hooked into an ear 34 of the latch member. The spring 28ª normally holds the pawl 23 into one of the notches in frame. The back end of A is bevelled as at 34 and the rear end of the frame is curved up to form a lug 35, and as the frame is drawn forward and the pan raised the lug slides under the back end of the member A and securely holds the latch pawl 21 clear from the ratchet wheel 26 until the frame is pressed backward again. The distance back which the frame may be tilted or moved and the consequent depth to which the scraper pan may be permitted below the wheels is regulated by stop blocks 36, on the outside of the frame which are adjusted by placing them in a series of holes 37 provided along the sides of the frame; and it will be understood that when these blocks are brought back against the posts 6 of the axle, that no further depression of the pan is possible.

I claim:

1. A combination scraper and dumping vehicle with carrying wheels, a U-shaped axle, a frame, a pivot above the center of the axle supporting said frame, a scraper pan pivotally supported by the frame approximately at the center of the pan, lugs on the pan, hooks pivotally connected to the frame and cooperating with the lugs and means for operating the hooks to release the same from the lugs and force the hooks again under the lugs, means for holding the arms of the axle in a predetermined position with respect to the sides of the frame, means for operating the holding means for readjusting the said position of the frame and axle, and means for emptying said scraper either forwardly or rearwardly.

2. In a scraper and dump vehicle with carrying wheels mounted on a U-shaped axle, with a scraper pan pivotally supported on the frame near the center thereof, the pan revolvable about the pivotally supporting center, and means for holding the pan in a predetermined position for digging or carrying material, said frame being mounted pivotally to the axle at a point above the center of the axle to permit the frame to move forward and back to a predetermined position adjacent the axle means for holding the axle and frame in a fixed position with each other, and means for emptying said scraper either forwardly or rearwardly.

3. In a scraper and dump apparatus with a frame supported on an axle with carrying wheels on the axle, with a scraper pan supported by the frame and means for raising the wheels above the lower edge of the pan, and means for raising the pan above the lower edges of the wheels, means for holding the pan and wheels in predetermined positions with each other, and for readjusting such positions, and means for emptying said scraper either forwardly or rearwardly.

In testimony whereof I affix my signature.

RODERICK P. McNEIL.